(12) United States Patent
Krishnan

(10) Patent No.: US 12,554,346 B2
(45) Date of Patent: Feb. 17, 2026

(54) ADJUSTABLE COMPUTER MOUSE

(71) Applicant: Microsoft Technology Licensing, LLC, Redmond, WA (US)

(72) Inventor: Ahilan Anantha Krishnan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/777,541

(22) Filed: Jul. 19, 2024

(65) Prior Publication Data

US 2026/0023444 A1    Jan. 22, 2026

(51) Int. Cl.
*G06F 3/038* (2013.01)
*G06F 3/0354* (2013.01)

(52) U.S. Cl.
CPC .......... *G06F 3/038* (2013.01); *G06F 3/03543* (2013.01); *G06F 2203/0332* (2013.01)

(58) Field of Classification Search
CPC ................ G06F 3/038; G06F 3/03542; G06F 2203/0332
See application file for complete search history.

(56) References Cited

U.S. PATENT DOCUMENTS

| | | | | |
|---|---|---|---|---|
| 5,870,081 | A * | 2/1999 | Wu ..................... | G06F 3/03543 345/163 |
| 10,324,541 | B2 * | 6/2019 | Lee ..................... | G06F 3/03543 |
| 10,592,008 | B1 * | 3/2020 | Wang ................. | G06F 3/0346 |
| 11,119,586 | B2 * | 9/2021 | Zarnowitz ........... | G06F 3/03543 |
| 2010/0253627 | A1 | 10/2010 | Atzmon | |
| 2011/0078801 | A1 * | 3/2011 | Bae ..................... | G06F 16/972 715/733 |
| 2015/0022451 | A1 | 1/2015 | Drougge | |
| 2015/0138092 | A1 * | 5/2015 | Lo ...................... | G06F 3/03543 345/163 |
| 2015/0261324 | A1 | 9/2015 | Huang | |
| 2015/0286296 | A1 * | 10/2015 | Wang ................. | G06F 3/03543 345/163 |
| 2015/0331503 | A1 * | 11/2015 | Choi ................... | G06F 3/03543 345/163 |
| 2016/0209941 | A1 * | 7/2016 | Hadas ................ | G06F 3/03543 |
| 2016/0334865 | A1 * | 11/2016 | Siegfried ............ | G06F 3/01 |
| 2017/0192536 | A1 * | 7/2017 | Wang ................. | G06F 3/03543 |
| 2018/0239447 | A1 | 8/2018 | Lee | |
| 2024/0319802 | A1 * | 9/2024 | Lee ..................... | G06F 3/0354 |

FOREIGN PATENT DOCUMENTS

CN         204215370 U    3/2015

OTHER PUBLICATIONS

Extended European search report received for European Application No. 25189701.3, mailed on Aug. 7, 2025, 9 Pages.

* cited by examiner

*Primary Examiner* — Ariel A Balaoing
(74) *Attorney, Agent, or Firm* — Rainier Patents, P.S.

(57) ABSTRACT

This document generally relates to computer mice that have customizable physical configurations. One example includes a mouse that has adjustable height, tilt, and cant relative to a horizontal reference surface. A host device, such as a computer is configured to generate a user interface (UI) through which a user can define a desired height, tilt, and cant and the host device configured to cause the mouse to automatically adjust to the desired height, tilt, and cant defined by the user on the UI.

18 Claims, 15 Drawing Sheets

Adjust overall mouse height by clicking on the corresponding center arrow "C" or entering the letter "C". Adjust mouse orientation by clicking on the left "L", right "R", front "F", or back "B" arrows or entering the corresponding letters to raise that region of the mouse.

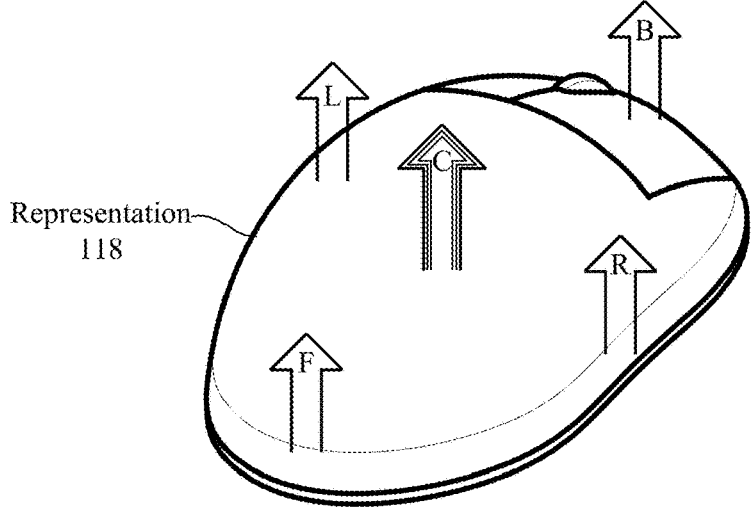

Representation 118

Ten positions are available for each region to accommodate your preferences.

UI 114

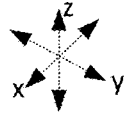

FIG. 1C

This is a preview of your changes. You can implement the changes on the mouse or delete the changes and maintain the current mouse configuration.

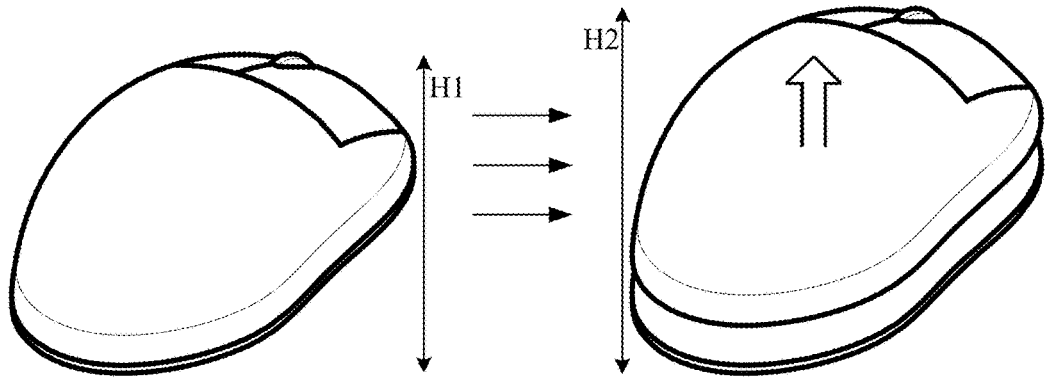

Existing mouse configuration

New mouse configuration ( Implement )  ( Delete )

UI 114

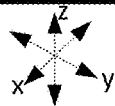

FIG. 1D

Adjust overall mouse height by clicking on the corresponding center arrow "C" or entering the letter "C". Adjust mouse orientation by clicking on the left "L", right "R", front "F", or back "B" arrows or entering the corresponding letters to raise that region of the mouse.

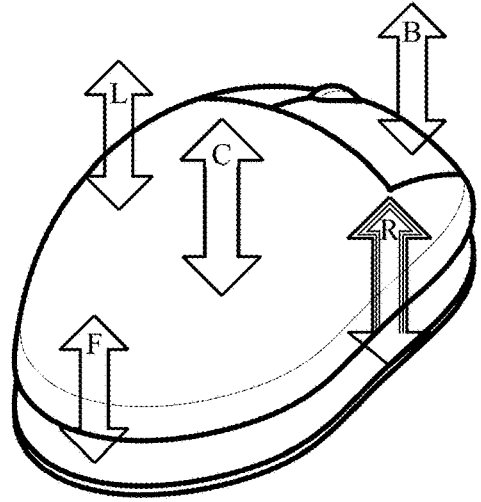

Ten positions are available for each region to accommodate your preferences.

UI 114

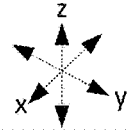

FIG. 1F

This is a preview of your changes. You can implement the changes on the mouse or delete the changes and maintain the current mouse configuration.

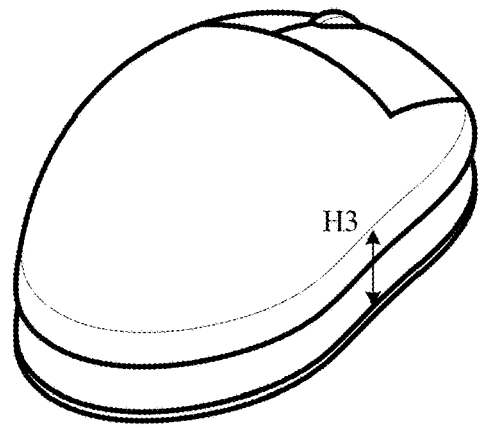 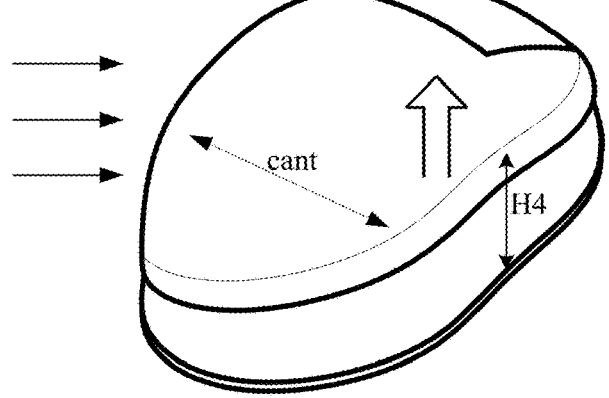

Existing mouse configuration                  New mouse configuration (Implement)     (Delete)

UI 114

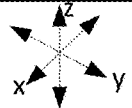

FIG. 1G

Instance One - Retracted

Instance Two - Extended

Instance One - Retracted

Instance Two - Extended

SSOA mouse 102E

SSOA mouse 102F

ADJUSTABLE COMPUTER MOUSE

BACKGROUND

Many computer users engage a computer mouse for many hours a day as a normal part of interacting with the digital world. This prolonged use can cause discomfort and even chronic medical conditions, such as carpal tunnel issues. Many styles of mice of different sizes and shapes are commercially available. Some retail stores allow users to physically compare multiple models side by side to try to find one that has a satisfying feel.

SUMMARY

This document generally relates to computer mice that have customizable physical configurations. One example includes a mouse that has adjustable height, tilt, and cant relative to a horizontal reference surface. A host device, such as a computer is configured to generate a user interface (UI) through which a user can define a desired height, tilt, and cant. The host device is configured to cause the mouse to automatically adjust to the desired height, tilt, and cant defined by the user on the UI.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIGS. 1A-1H illustrate an example computer mouse configuration scenario in which some of the present concepts can be employed in accordance with some implementations.

DETAILED DESCRIPTION

Overview

Figure 1A:
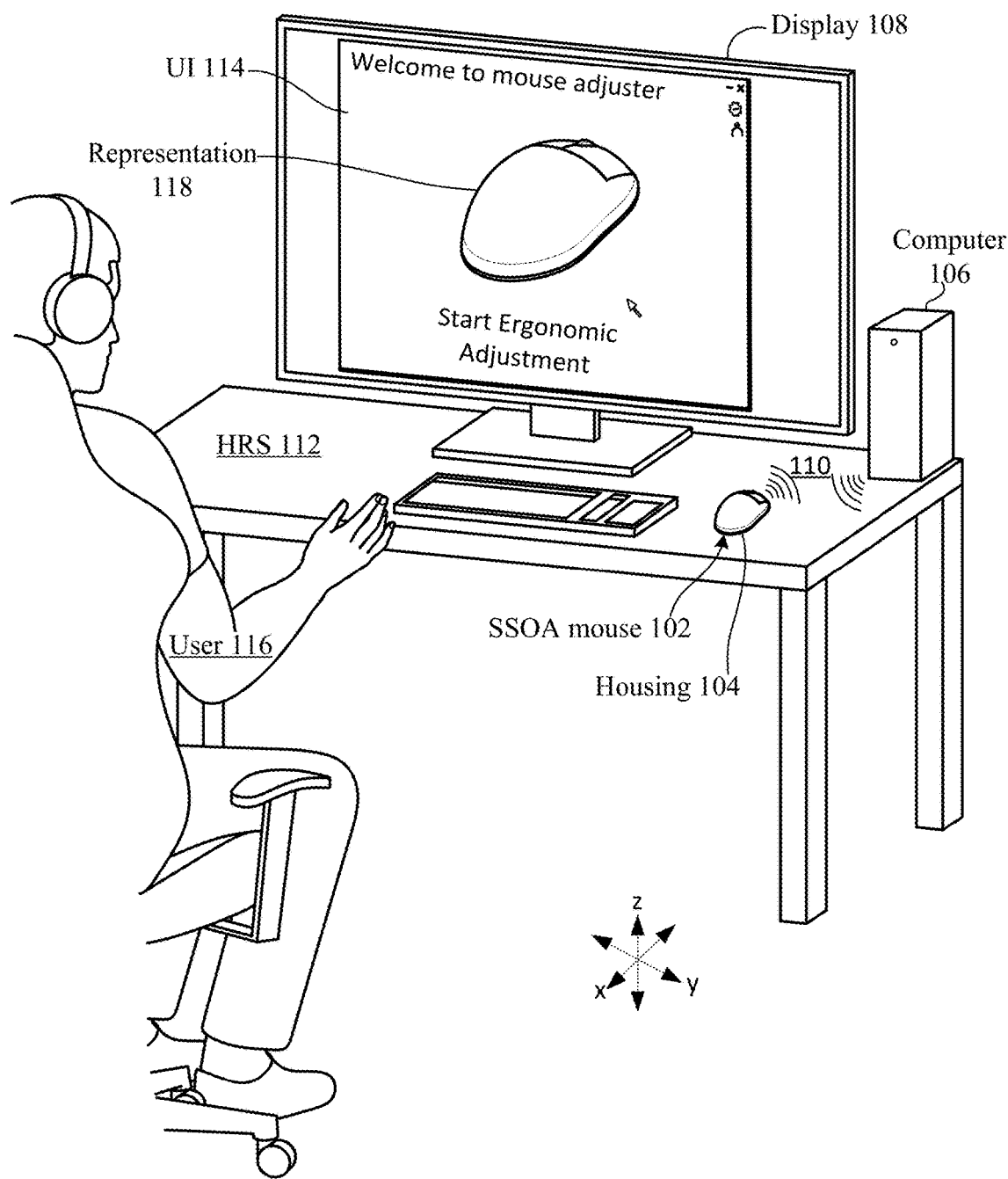

Many computer users engage a computer mouse for many hours a day as a normal part of interacting with the digital world. This prolonged use can cause discomfort and even chronic medical conditions, such as carpal tunnel issues. Many styles of mice of different sizes and shapes are commercially available. Some retail stores allow users to physically compare multiple models side by side to try to find one that has a satisfying feel. However, all of these existing mice have fixed physical configurations. Some of the present concepts address these shortcomings with several technical solutions. The present concepts provide a technical solution that allows the user to adjust physical aspects of the mouse. The adjustable aspects can relate to size, shape, and/or orientation of the mouse to accommodate user preferences.

The present mouse design concepts integrate adjustability with user comfort. This design allows users to tailor the mouse's form to their hand's shape and preferred grip, enhancing ergonomic support and reducing strain during prolonged use. The present concepts also provide visualizations of the user's mouse size, shape, and/or orientation changes so that the user can accept or further customize the size, shape, and/or orientation changes before they are implemented on the mouse. These and other novel aspects are described below.

Example Use Case Scenarios

FIGS. 1A-1H collectively show a use case scenario involving some of the present concepts implemented on an example system 100. This system includes a size, shape, and/or orientation adjustable computer mouse (e.g., SSOA mouse) 102 having an external housing 104. The system also includes a computer 106 (e.g., host device). In this example, the computer 106 is coupled to a display 108. In other configurations, the computer 106 could include the display 108 (e.g., a notebook or all-in-one computer). Many types of computers are contemplated, such as personal computers, android-based computers, or Apple brand computers, among others. The SSOA mouse 102 and the computer 106 can communicate with one another as indicated generally at 110. This communication can be achieved wirelessly according to various protocols, such as Bluetooth, or via a wired connection. For purposes of explanation, the SSOA mouse 102 can be used on a horizontal reference surface 112.

FIG. 1A shows an initial mouse adjustment user interface (UI) 114 generated by computer 106 and presented on display 108. This UI could be generated when user 116 connects SSOA mouse 102 to computer 106. Alternatively, the UI could be generated by the user invoking the UI, such as from a 'devices menu.' The UI shows a mouse representation 118 of the SSOA mouse 102. (FIG. 1A shows both the SSOA mouse 102 and the representation 118 of the SSOA mouse). Assume for purposes of explanation that the user selects 'start ergonomic adjustment' on UI 114 on FIG. 1A and responsively computer 106 generates a subsequent UI shown on FIG. 1B.

Figure 1B:
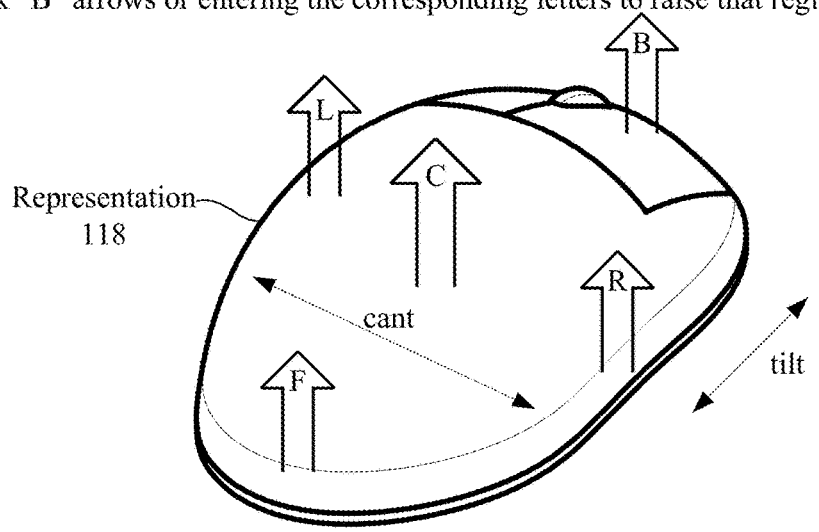

FIG. 1B shows a subsequent UI 114 in the scenario introduced in FIG. 1A. To avoid clutter on the drawing page, only the UI is shown on FIG. 1B. The UI 114 allows the user to adjust the mouse shape in two ways. The user can adjust the shape by adjusting the size (e.g., height) by selecting center arrow C. The user can adjust the shape by adjusting the orientation (e.g., canting the mouse from side-to-side and/or tilting the mouse from front-to-back). This can be accomplished by the user selecting a combination of the front arrow "F", back arrow "B", left arrow "L", and/or right arrow "R". Note that each selectable aspect (e.g., center, front, back, left, and right) can have a range of positions, such as ten positions, for example. Thus, for example, selecting the center arrow twice would increase the mouse overall height by 20% (e.g., 2 out of 10) of the overall height adjustment range in the z-reference direction. Stated another way, some implementations may allow an incremental range of values for the physical configuration of the SSOA mouse from which the user can select.

FIG. 1C shows subsequent UI 114 where the user is selecting to raise the overall mouse height (e.g., selecting the "C" arrow). A change of appearance (e.g., bolding) of the C arrow acknowledges the user selection. The user can make this selection in various ways, such as entering the letter "C" on the keyboard or using the SSOA mouse 102 to click on the C arrow. In this example, assume for purposes of explanation, that the user clicks on the "C" arrow five times to raise the overall height of the SSOA mouse 102 approximately 50% of its range.

Note that the present concepts provide a technical solution where the SSOA mouse 102 maintains normal mouse functionality during this phase. For instance, the user does not need to make any physical adjustments on the mouse, such as with a screwdriver. The user does not need to hold the mouse differently than usual. Further, the SSOA mouse 102 does not need any extra input buttons that are used for shape changing. Instead, the user can simply use the SSOA mouse 102 the same way they are accustomed with traditional mice.

FIG. 1D shows a subsequent UI 114 that previews the user's shape changes. This technical solution allows the user to compare the shape changes between the existing SSOA mouse configuration and the new SSOA mouse configuration. This implementation compares the overall height H1 of the existing SSOA mouse configuration to the overall height H2 of the new SSOA mouse configuration. The user can either implement the changes or delete the changes and retain the existing SSOA mouse configuration. Assume for purposes of explanation that the user selects to implement the changes.

Note that specific control inputs for the user to raise the SSOA mouse are described in this example. Other control inputs are contemplated. For instance, vertical sliding scales could replace each of the illustrated arrows. The sliding scales could include an indicator of the current height of the corresponding mouse portion on the scale. The user could move the indicator up or down to a desired position. This input could then be used to move the corresponding portions of the SSOA mouse by the indicated amount. Other input configurations are contemplated.

Figure 1E:
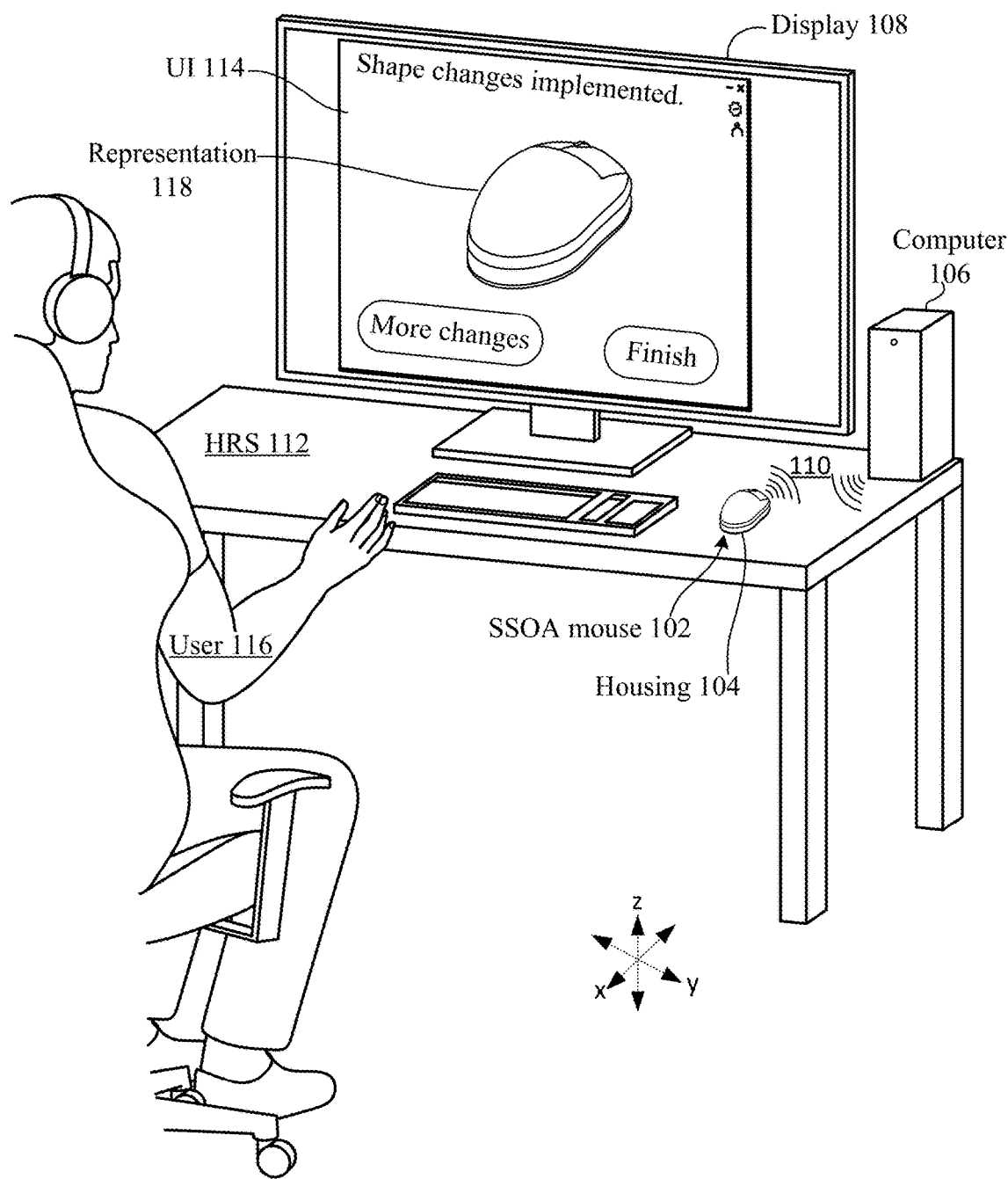

FIG. 1E shows a subsequent view of system 100. At this point, the computer 106 has caused SSOA mouse 102 to change shape in accordance with the user instructions of FIG. 1D. The SSOA mouse 102 now has a greater height than in the configuration of FIG. 1A. Stated another way, the SSOA mouse 102 has been automatically reconfigured from the existing mouse configuration shown on the left of FIG. 1D to the new mouse configuration shown on the right of FIG. 1D. This technical solution is accomplished as defined by the user through the UI. The user does not have to make any manual adjustments to the SSOA mouse and the SSOA mouse retains normal mouse functionality during the entire configuration process.

At the point shown in FIG. 1E the user can grasp the SSOA mouse 102 and consider whether the new shape configuration is the configuration they desire. If so, the user can select 'finish' on UI 114. If not, the user can select 'more changes' on the UI. For purposes of explanation, assume that in this case, the user wants to make some more changes to the mouse shape configuration and accordingly selects the 'more changes' option on the UI.

FIG. 1F shows a subsequent UI 114 that allows the user to make shape changes to the SSOA mouse 102. Note that beginning at FIGS. 1A-1C, the SSOA mouse 102 was at its lowest or smallest shape and thus the user could only raise it up. The user raised the whole SSOA mouse 102 as reflected in FIG. 1E. Now at this point the user has the option to raise or lower the SSOA mouse 102 as indicated by the two headed arrows (C, L, R, F, and B). For purposes of explanation, assume that the user wants to raise the right side of the SSOA mouse 102 to cant the mouse to the left. Accordingly, the user has selected the top of the "R" arrow by clicking on it or entering the letter R. This is represented by the bolding the top of the R arrow compared to the other arrows on FIG. 1F.

FIG. 1G shows a subsequent UI 114 that previews the user's changes. The user can compare the changes between the existing SSOA mouse configuration (which was the new mouse configuration in FIG. 1D) and the new SSOA mouse configuration. This preview UI compares the height of the right side H3 of the existing mouse configuration to the new right-side height H4 of the new mouse configuration. The user can either implement the changes or delete the changes and retain the existing SSOA mouse configuration. Assume for purposes of explanation that the user selects to implement the changes. While not specifically shown, the user can use the same technique to tilt the mouse front to back.

Figure 1H:
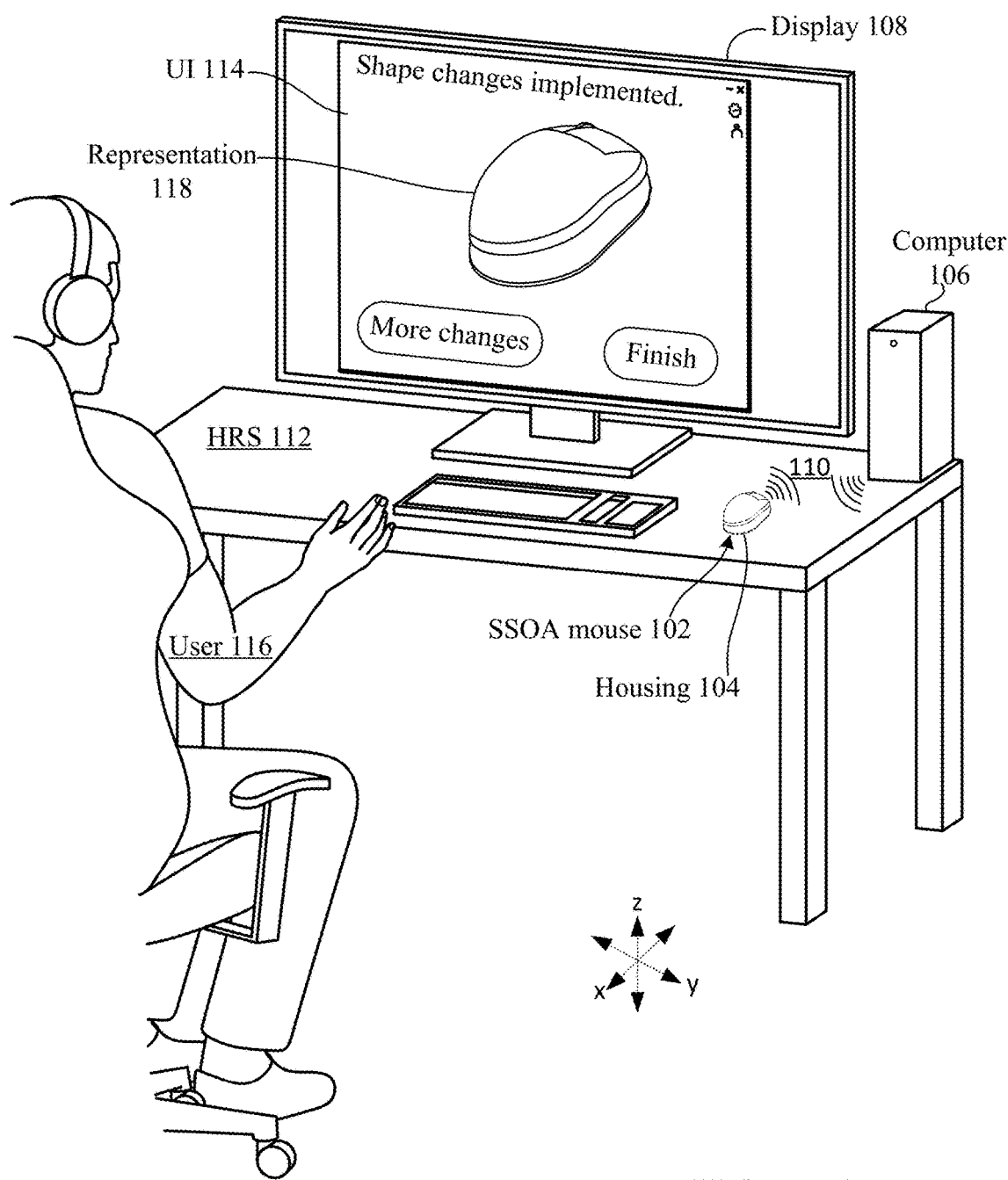

FIG. 1H shows the recent changes reflected on both the SSOA mouse 102 and the representation 118. At this point, the technical solution allows the user to test the new shape configuration to ensure they like it. If so, the user can select 'finish' and proceed to use the SSOA mouse, with its user customized shape, in a normal manner. The user can also save the current shape settings so the SSOA mouse returns to these settings for this user. Thus, the SSOA mouse can be automatically shape adjusted for multiple users depending on which user is logged in on the computer 106.

The aspects described above relative to FIGS. 1A-1H include technical solutions that provide mouse shape customizations to the user including height or orientation and both height and orientation. In the illustrated example, these customizations are achieved through the F, B, L, R, and C arrows. These technical solutions provide ergonomic benefits to the user that can provide health benefits and/or enhance user comfort. These technical solutions also allow the user to visualize representations (e.g., previews) of the customizations before they are implemented on the mouse.

Figure 2:
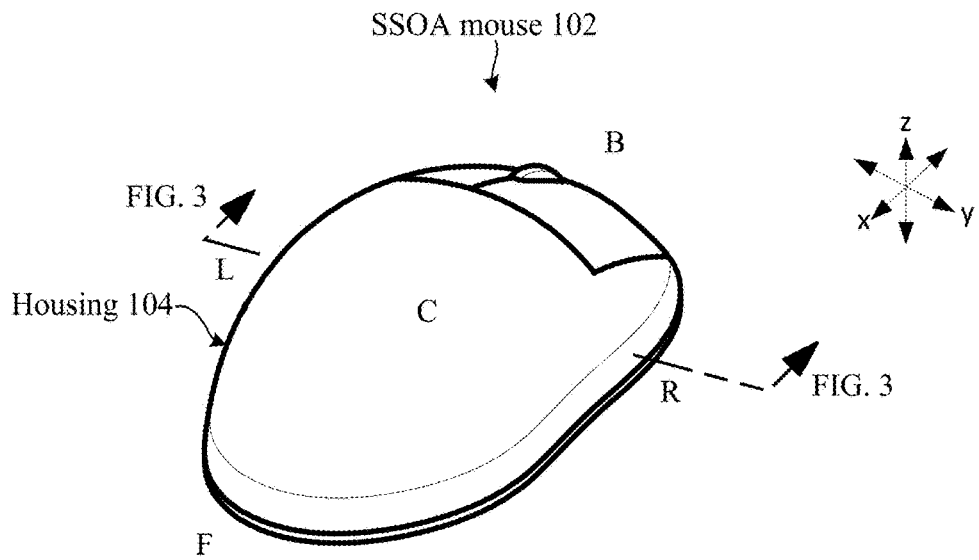
FIGS. 2 and 7 illustrate perspective views of example computer mice that can implement the present concepts in accordance with some implementations.
Figure 3:
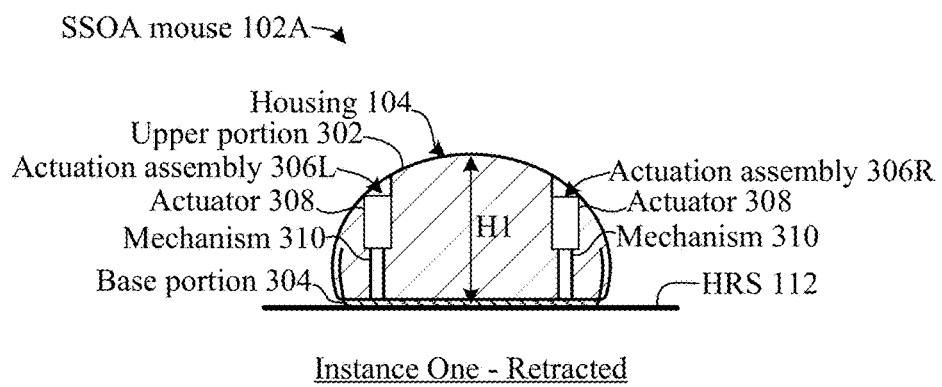
FIGS. 3, 6, and 8-12 illustrate sectional views of example computer mice that can implement the present concepts in accordance with some implementations.
Figure 3:
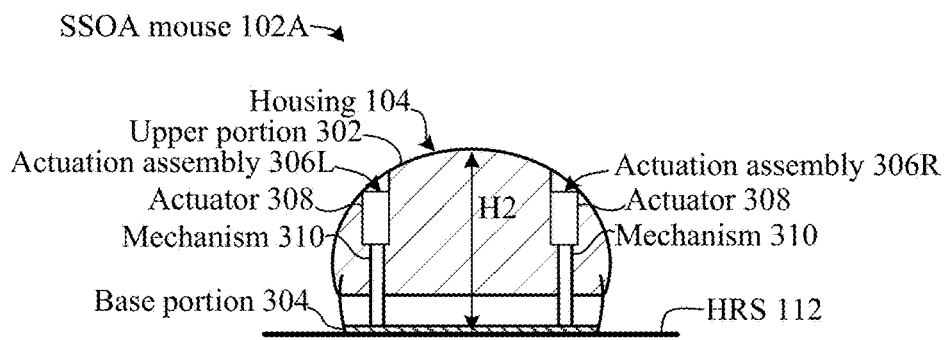
Figure 4:
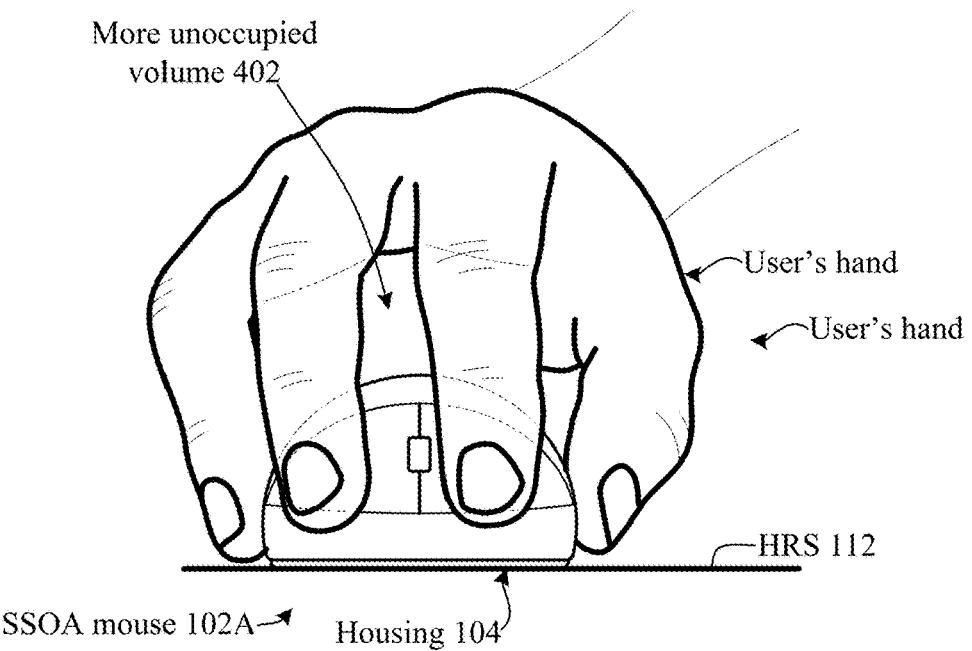
FIGS. 4, 5A-5C, and 13 illustrate elevational views of example computer mice that can implement the present concepts in accordance with some implementations.
Figure 4:
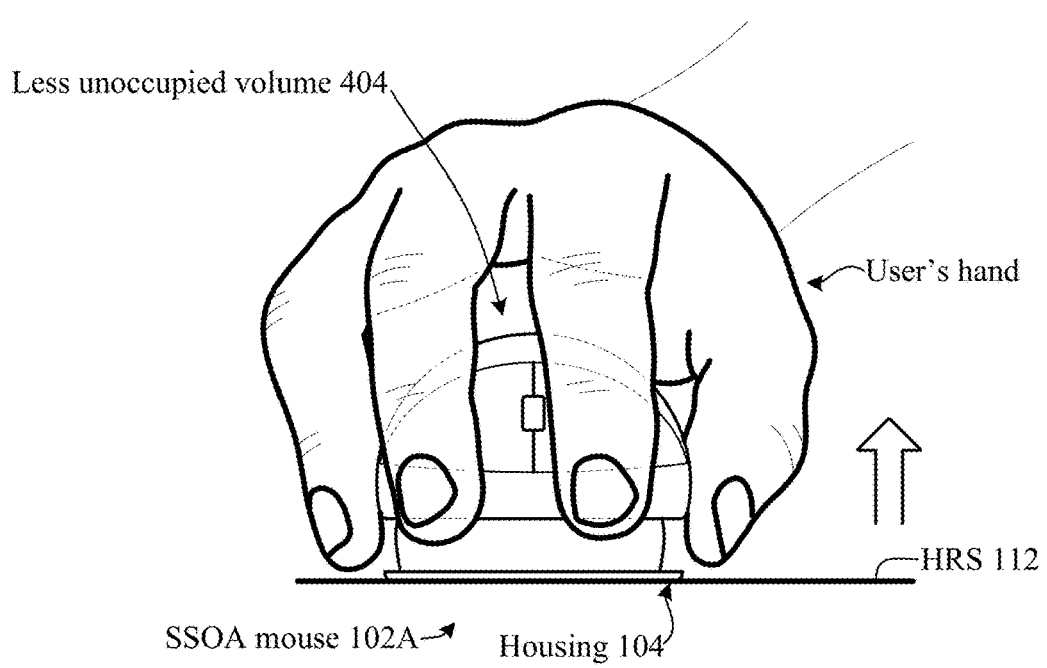
Figure 4:
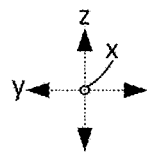
Figure 5A:
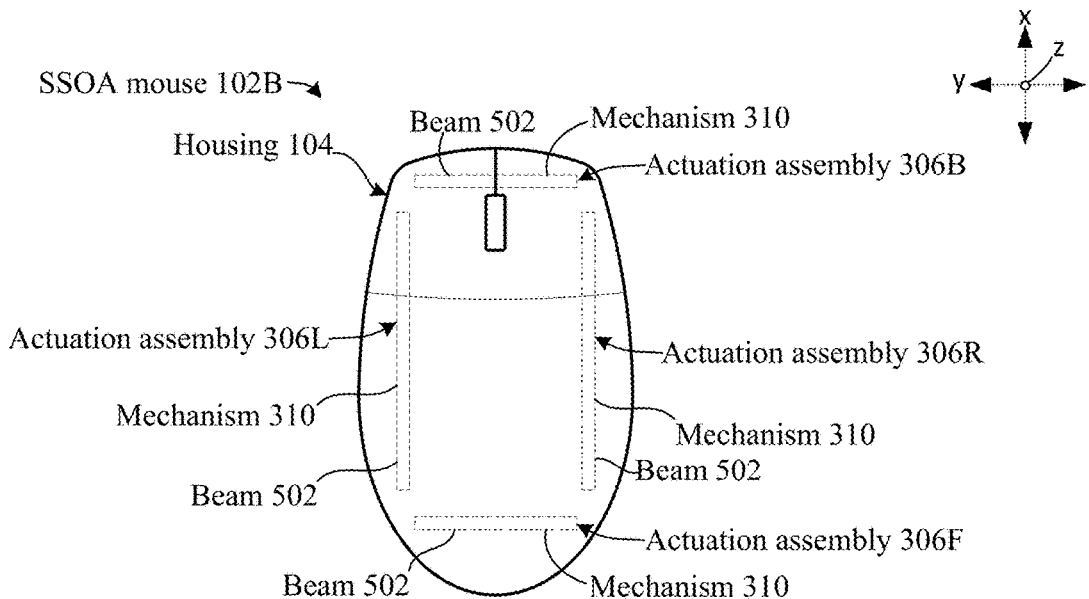
Figure 5B:
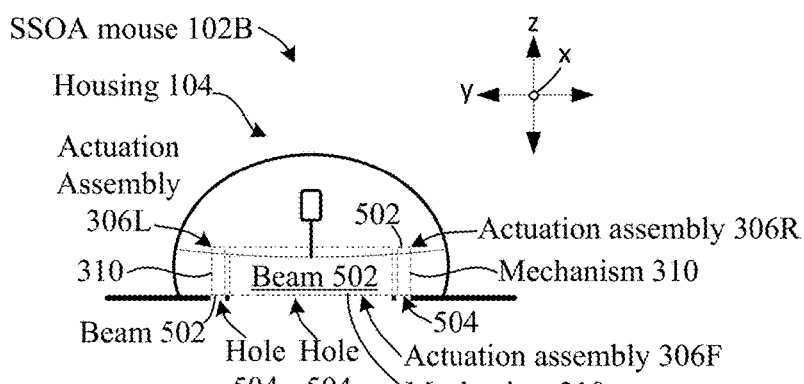
Figure 5C:
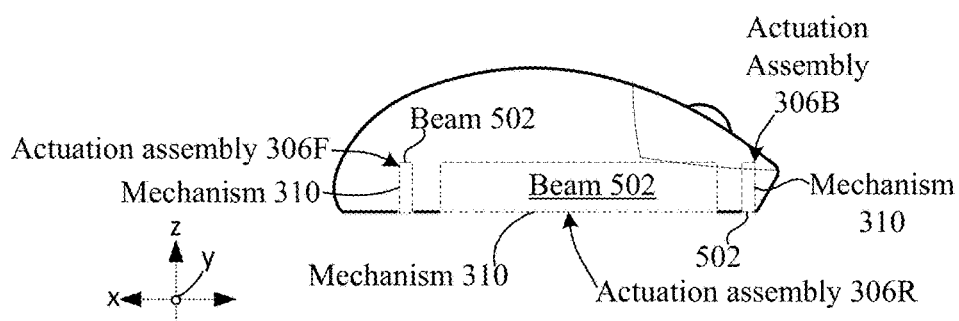

FIGS. 2-4 collectively show further aspects of the present SSOA mouse concepts. FIG. 2 shows a perspective view of SSOA mouse 102. FIG. 2 indicates a sectional view of FIG. 3 taken through the yz reference plane.

FIG. 3 shows a sectional view of SSOA mouse 102A. In this implementation, the housing 104 includes an upper portion 302 that overlaps a base portion 304. SSOA mouse 102A includes actuation assemblies 306 that extend between the upper portion 302 and the base portion 304. This view shows actuation assemblies 306L and 306R. Actuation assemblies 306 for the front and the back are not shown, but are similar. The overlap of the upper portion 302 and the base portion 304 provides a technical solution that conceals the actuation assemblies 306 when viewed from outside the housing.

The actuation assemblies 306 include actuators 308 and mechanisms 310. The actuators 308 and mechanisms 310 are configured in a one-to-one manner (e.g., actuator/mechanism pairs). The actuators 308 are secured/connected to the upper portion 302 and the mechanisms 310 are secured/connected to the base portion 304. The actuators 308 can retract and extend the mechanism 310 and thereby decrease and increase the distance between the upper portion 302 and the base portion 304 of the housing 104.

In this case, the actuation assemblies 306 are manifest as jack screws. The actuators 308 are electric motors in a threaded housing. The mechanisms 310 are elongated screws that are threaded into the housing and can be turned in both directions by the electric motor to extend and retract the screw. Other actuation assembly configurations are described below.

Equal activation of all of the actuation assemblies 306 pushes the upper portion 302 away from the base portion 304 and raises the overall SSOA mouse height (H). Activation of individual actuation assemblies 306 changes the mouse orientation. For example, the actuator assemblies 306 can be extended and retracted together to increase and decrease the overall height (H) of the housing. Instance One shows both actuator assemblies 306L and 306R retracted to produce the shorter height H1 as shown in FIG. 1D. Instance Two shows both actuator assemblies 306L and 306R extended to produce the greater height H2 as shown in FIG. 1D. Extending either of actuator assemblies 306L or 306R while retracting (or extending to a lesser extent) the other of actuator assemblies 306L or 306R will cant the housing 104 left or right as illustrated in FIG. 1G.

FIG. 3 shows the overall height adjustment of the SSOA mouse 102A in isolation. FIG. 4 shows how this height adjustment allows the SSOA mouse 102A to accommodate a range of hand sizes. The greater height allows the housing 104 to occupy a greater volume to better accommodate larger user hands. This is evidenced in Instance One of FIG. 4, which corresponds to Instance One of FIG. 3 where the actuation assemblies 306 are retracted. This produces relatively more unoccupied volume 402. The unoccupied volume can be defined as the difference between the volume defined by the user's cupped hand (around the SSOA mouse 102A) and the volume defined by the SSOA mouse 102A.

Instance Two of FIG. 4 corresponds to Instance Two of FIG. 3 where the actuation assemblies 306 are extended to raise the overall height of the SSOA mouse 102A. This provides a technical solution that increases the height and volume of the SSOA mouse 102A and thus there is relatively less unoccupied volume 404 compared to the retracted position of Instance One. For user's with larger hands, this increases the user's comfort and satisfaction with the SSOA mouse 102A and potentially decreases chronic discomfort and injury.

FIGS. 5A-7 collectively show another example SSOA mouse 102B. In this case, rather than changing dimensions of the housing 104, the mechanisms 310 extend out of the housing to change its height and/or orientation. In this example, the mechanisms 310 can entail beams 502 that extend generally along the front, back, left, and right sides of the housing 104. The beams 502 can be extended out of holes 504 in the housing 104 to contact the horizontal reference surface 112. Stated another way, the beams 502 can be extended vertically out of the holes towards the horizontal reference surface. Contact between the mechanism 310 and the horizontal reference surface 112 can lift the whole housing 104 uniformly and/or tilt the housing. While not shown, dedicated electric motors can drive each beam, such as in a rack and pinion configuration to convert motor rotation to linear (e.g., vertical) movement of the beam. Other example actuator assemblies for driving the beams are described below relative to FIGS. 8-13.

Figure 6:
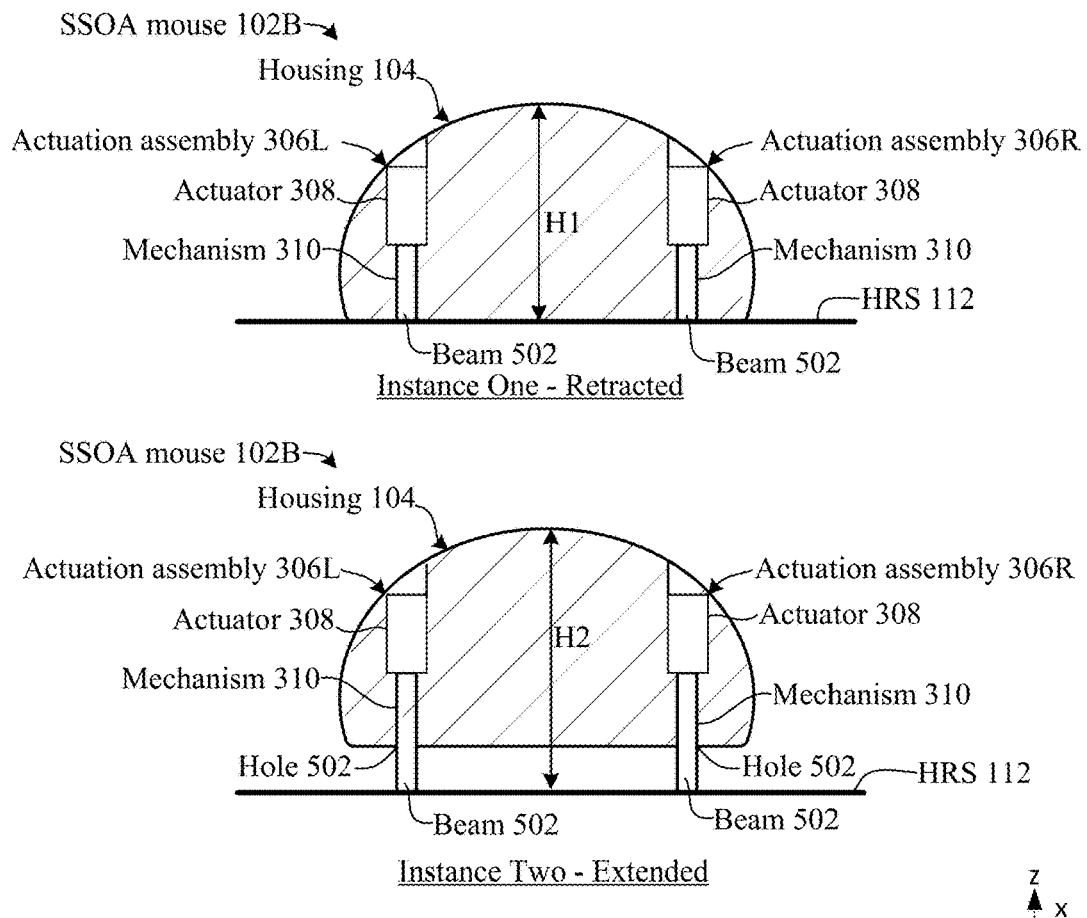
Figure 6:
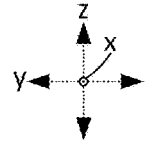

On FIG. 6, Instance One shows the actuator assemblies 306 in a retracted position which decreases overall height H1 of the SSOA mouse 102B. Instance Two shows the actuator assemblies 306L and 306R extending the mechanisms 310 through the holes 504 in the extended position. Contact between the mechanisms 310 and the horizontal reference surface 112 lifts the housing 104 and hence the SSOA mouse 102B and increases the overall height H2.

Figure 7:
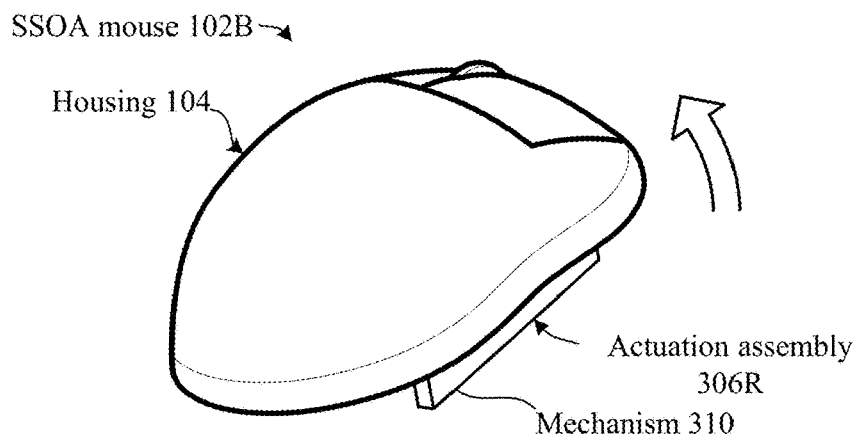
Figure 7:
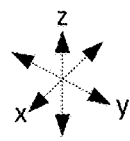

FIG. 7 shows SSOA mouse 102B canted to the left. FIG. 7 shows mechanism 310 of actuator assembly 306R extended while the other actuator assemblies are retracted and not visible. This cants the housing 104 to the left as shown in FIG. 7. In this configuration, the lower surface of the beams that contacts the horizontal reference surface can have a similar coefficient of friction as the underside of the housing 104 so that the SSOA mouse slides in a similar manner whether sliding on the housing 104, the beams 502, or a combination of the housing and the beams.

The concepts described relative to FIGS. 2-7 provide technical solutions that allow users to tailor the SSOA mouse's form to their hand's shape and preferred grip, enhancing ergonomic support, and/or reducing strain during prolonged use.

Figure 8:
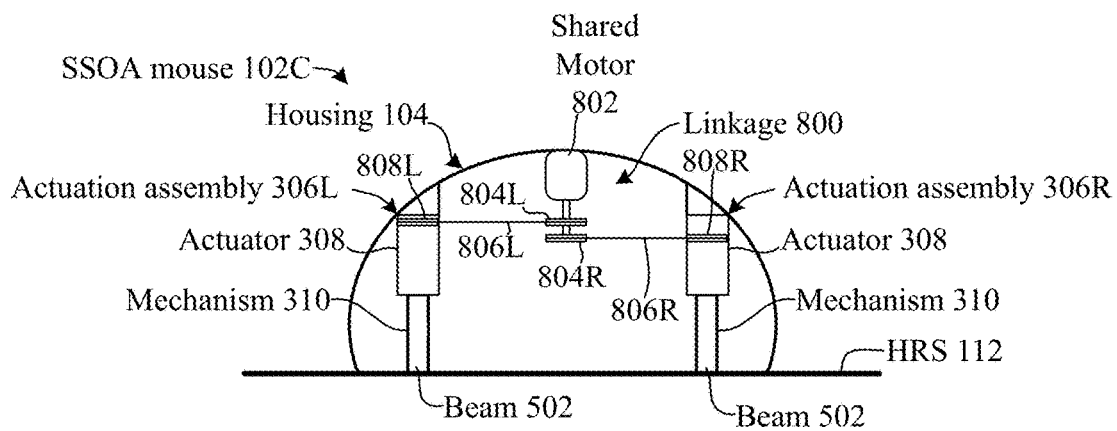
Figure 9:
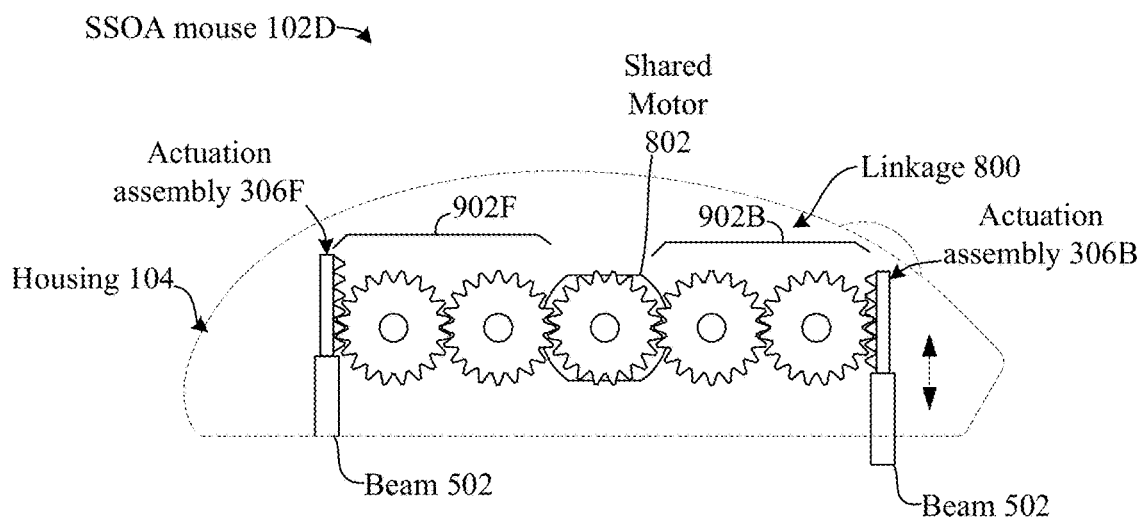
Figure 10:
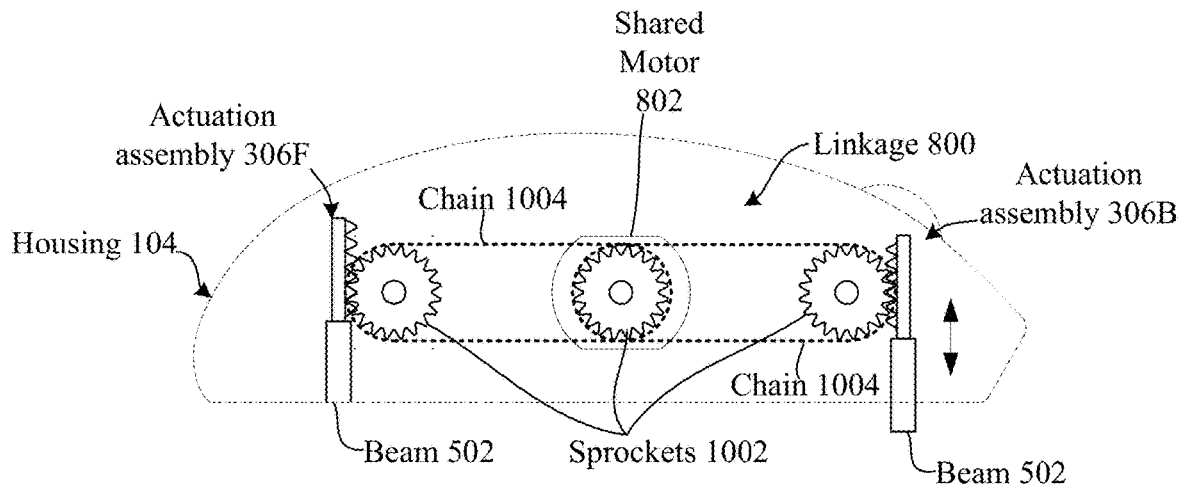
Figure 10:
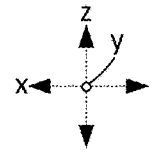

FIGS. 8-10 show SSOA mouse examples that employ linkages 800 shared by a single actuator. In this case the single actuator is a shared motor. These implementations can employ less than one actuator 308, such as motors 802, per mechanism 310 (e.g., less than a one-to-one ratio). These implementations employ reduced numbers of actuators 308, and even one actuator per SSOA mouse 102 by leveraging mechanical linkages 800 to translate motion, enabling both synchronized and individual adjustments of the mechanisms 310, such as beams 502. Using mechanical linkages 800 to enable adjustments with fewer actuators is both cost-effective and simpler in terms of its internal mechanism. This reduction in complexity can lead to greater durability and lower manufacturing costs, while still providing a high degree of customization.

FIG. 8 shows SSOA mouse 102C. This implementation employs linkages 800 between a shared motor 802 and the mechanisms 310 of multiple actuation assemblies 306. Thus, the linkages 800 allow the shared motor 802 to function as the actuator 308 (e.g., single actuator) for multiple actuation assemblies 306. In the illustrated configuration, the shared motor 802 can drive either or both of actuation assemblies 306L and 306R. While not shown, the shared motor 802 could also drive actuation assembly 306F and/or actuation assembly 306B. In this example, the shared motor is coupled to the actuation assemblies by pulleys 804 and belts 806. The belts 806 in turn are coupled to clutches 808 on the actuation assemblies 306. When the motor turns, the clutch can either transfer the rotation to its respective mechanism 310 or slip (e.g., freewheel) and not transfer the rotation to the respective mechanism. Thus, the motor can be turned on and then individual mechanisms 310 can be selectively activated with their respective clutches 808. The use of a single shared motor can provide a technical benefit of conserving space in the mouse (e.g., a single motor occupies less of the internal space of the mouse than multiple motors). Further, employing a single motor can decrease power usage and/or device cost compared to multiple motors.

FIG. 9 shows another SSOA mouse 102D. In this case, linkage 800 is manifest as rack and pinion gear sets 902. In this configuration, shared motor 802 drives rack and pinion gear sets 902 for actuation assemblies 306F and 306B. A similar configuration could be employed for actuation assemblies 306L and 306R.

FIG. 10 shows another SSOA mouse 102E. In this case, linkage 800 is manifest as sprockets 1002 and chains 1004 connecting the shared motor 802 to actuation assemblies 306F and 306B. A similar configuration could be employed for actuation assemblies 306L and 306R.

Figure 11:
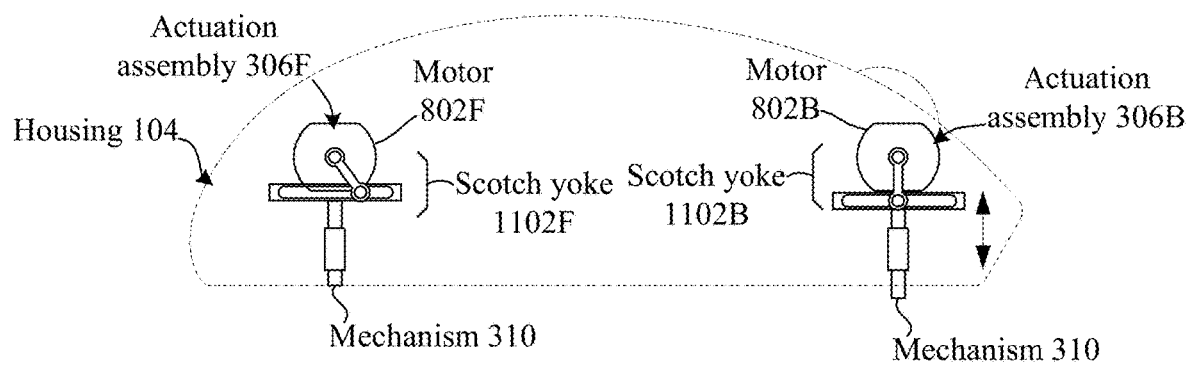
Figure 11:
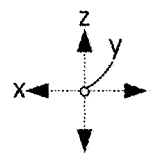

FIG. 11 shows another SSOA mouse 102F. This implementation employs a dedicated motor 802 for each actuation assembly 306. This implementation employs scotch yoke mechanisms 1102 to convert rotation of the motors 802 to vertical linear movement of the mechanism 310. The mechanism 310 can be manifest as a post, beam, or other structural member. While not shown, a similar configuration could be employed for actuation assemblies 306L and 306R. Employing dedicated motors can decrease linkages and hence complexity in the mouse.

Figure 12:
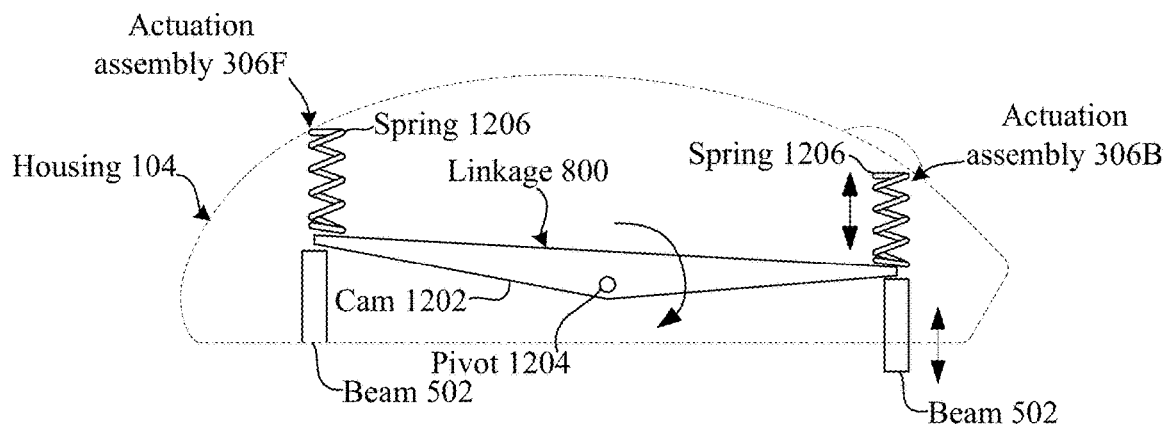

FIG. 12 shows another SSOA mouse 102G. In this case, linkage 800 is manifest as an elongate cam 1202 with a central pivot 1204. Springs 1206 provide a bias to the ends of the cam 1202. A similar configuration could be employed for actuation assemblies 306L and 306R. This implementation lends itself to either an automatic configuration or a manual configuration. In the automatic configuration, a motor (not shown) can drive rotation around the pivot 1204 to adjust the beams 502. In the manual configuration, a dial could be positioned externally on the housing 104. The user could turn the dial clockwise or counter-clockwise to adjust the shape of the housing 104.

Figure 13:
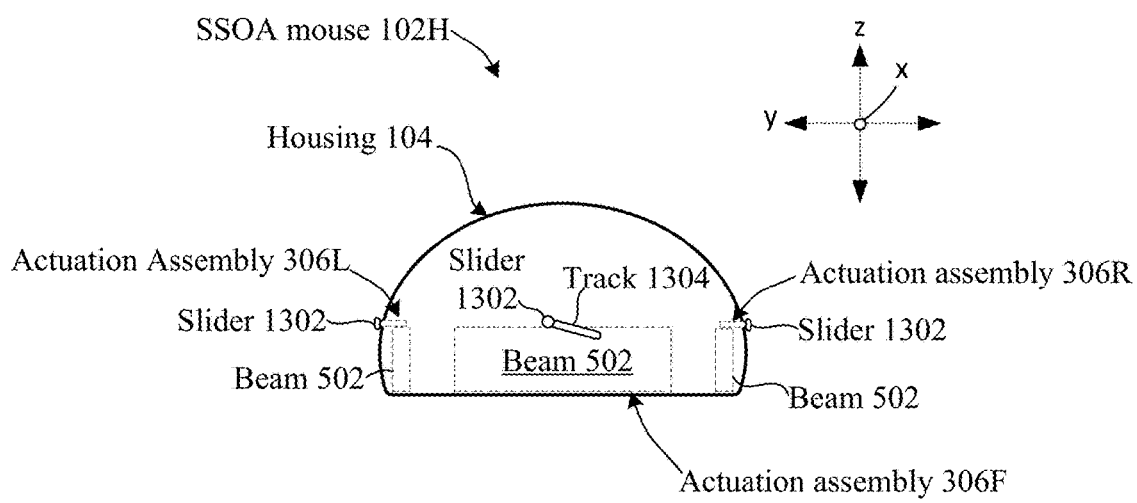

FIG. 13 shows another SSOA mouse 102H. This implementation employs a manually controllable slider 1302 relative to each beam 502. In FIG. 13 sliders 1302 are visible relative to actuation assemblies 306L, 306F, and 306R. The remaining actuation assembly (306B) and hence the corresponding sliders are facing away from the reader and are not visible.

The sliders 1302 extend through the housing 104 through tracks 1304 (visible and labelled relative to actuation assembly 306F). Thus, part of the sliders 1302 are on the outside of the housing 104 and are accessible to the user. Other parts of the sliders are on the inside of the housing 104 and engage the respective beams 502. Note that the tracks 1304 are not horizontal and instead are slightly angled, such as 10-20 degrees from horizontal. When the user moves an individual slider along its track in the downward direction, the slider contacts the corresponding beam 502 and forces the beam downward relative to the housing 104. In a similar manner, when the user moves the slider upward, the slider allows the beam to move upward. The user can use any combination of the four sliders 1302 to change the height and/or orientation of the housing 104.

In the illustrated configuration, the tracks 1304 are angled and the tops of the beams are horizontal. An alternative configuration could employ angled tops on the beams 502 and the tracks 1304 could be horizontal. The illustrated implementation employs manual slider adjustment. This implementation also lends itself to automation. In such an implementation the sliders 1302 are contained within the housing 104. Movement of the slider is provided by one or more motors.

The implementation shown in FIG. 13 includes four adjustable beams 502 located along its edges, allowing users to customize its shape for optimal hand fit and comfort. This SSOA mouse 102H thus achieves a range of orientations, tilts and heights. The SSOA mouse can function in both mechanical (manual) and automated control versions, with the latter offering enhanced control through controlled manipulation of the actuators.

The SSOA mouse concepts described above provide technical solutions including customizable ergonomics. Unlike traditional mice with a fixed shape, the present concepts allow users to adjust the shape, size, and/or orientation of the mouse. For instance, some implementations employ beams along the edges of the housing. User adjustment of individual beams provides a customized alignment/positioning that is comfortable for the individual user's hand. This level of customization is a significant departure from one-size-fits-all models and can lead to better hand and wrist posture (e.g., comfort and reduce long term wrist related health problems).

Example Systems

Figure 14:
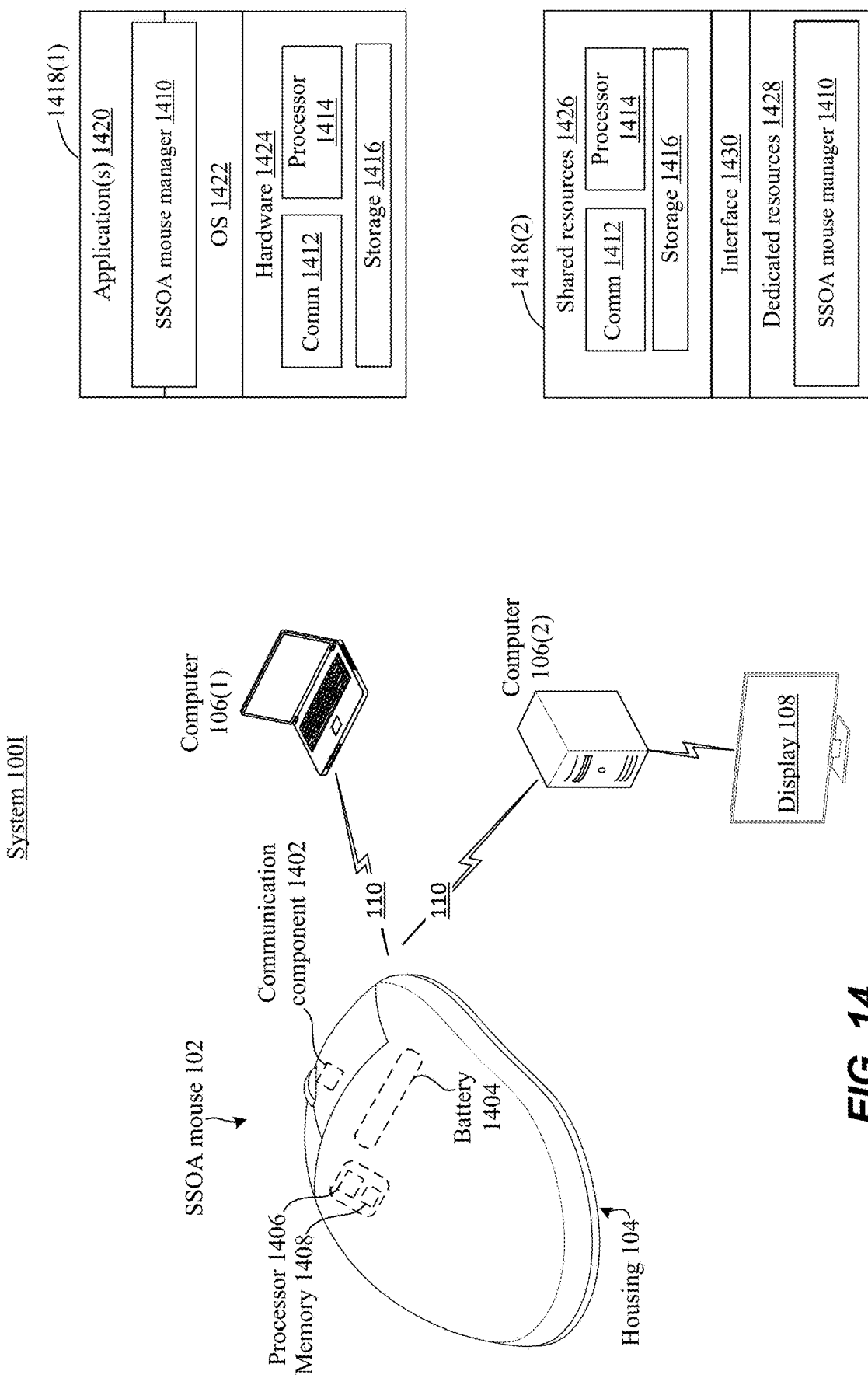
FIG. 14 illustrates an example system that can implement the computer mouse configuration concepts in accordance with some implementations.

FIG. 14 shows another example system 100I, that is similar to system 100 introduced above relative to FIG. 1A. System 100I can include SSOA mice 102 and computers 106. Individual SSOA mice 102 and computers 106 can be physically coupled by a cord or wirelessly coupled. This coupling 110 is represented by lightning bolts.

SSOA mice 102 can include a communication component 1402, a battery 1404, a processor 1406, and/or memory/storage 1408. The communication component 1402 can include components and circuitry for communicating in accordance with one or more wireless technologies, such as Bluetooth, Wi-Fi, etc.

The battery 1404 can be a standard or rechargeable battery configured to store and deliver power for functioning of the SSOA mouse 102. The processor 1406, such as a microcontroller, coordinates the function of the other components of the SSOA mouse 102 (e.g., communication component 1402, battery 1404, input devices (shown but not designated), sensors, actuation assemblies, etc.). The processor 1406 can coordinate the control of the other components via instructions received from computer 106 and/or stored on memory/storage 1408.

Computers 106 can include an SSOA mouse manager 1410, a communication component 1412, a processor 1414, and storage resources (e.g., storage) 1416. Computers 106 communicate with the SSOA mouse 102 via communication components 1412. The communication component 1412 may communicate with other devices, such as cloud-based devices, via wired or wireless technologies.

FIG. 14 shows two device configurations 1418 that can be employed by computers 106. Computers 106 can employ either configuration 1418(1) or 1418(2), or an alternate configuration. (Due to space constraints on the drawing page, one instance of each configuration is illustrated). Briefly, device configuration 1418(1) represents an operating system (OS) centric configuration. Device configuration 1418(2) represents a system on a chip (SOC) configuration. Device configuration 1418(1) is organized into one or more applications 1420, operating system 1422, and hardware 1424. Device configuration 1418(2) is organized into shared resources 1426, dedicated resources 1428, and an interface 1430 therebetween.

In configuration 1418(1), the SSOA mouse manager 1410 can be manifest as part of the operating system 1422. Alternatively, the SSOA mouse manager 1410 can be manifest as part of the applications 1420 that operates in conjunction with the operating system 1422 and/or processor 1414. The SSOA mouse manager 1410 can include application programming interfaces (APIs) and/or drivers, In configuration 1418(2), the SSOA mouse manager 1410 can be manifest as part of the processor 1414 or a dedicated resource 1428 that operates cooperatively with the processor 1414.

The SSOA mouse manager 1410 generates the UI on behalf of the SSOA mouse 102. Example UIs are described above relative to FIGS. 1A-1H. The SSOA mouse manager 1410 can receive user input relating to the UI. The SSOA mouse manager 1410 can send this user input to the SSOA mouse 102 (e.g., communication component 1412 to communication component 1402).

The SSOA mouse's processor 1406 can determine how to implement the received user input. For instance, the processor 1406 could reference a look-up table stored on memory 1408. The look-up table can indicate which actuators to actuate for the received user input, what power to apply to these actuators, and for how long. The processor can then cause power from the battery 1404 to be delivered to these actuators to achieve the movement (e.g., raising or lowering) of portions of the housing indicated by the user input.

In an alternative configuration, user input received via the user interface may be processed by the SSOA mouse manager 1410. For instance, a look-up table similar to the one described above may be accessed by the SSOA mouse manager 1410 to identify corresponding commands. The SSOA mouse manager can transmit the commands to the SSOA mouse 102 for implementation by processor 1406.

The term "device," "computer," or "computing device" as used herein can mean any type of device that has some amount of processing capability and/or storage capability. In this regard, the SSOA mouse 102 can also be viewed as a device. Processing capability can be provided by one or more processors that can execute data in the form of computer-readable instructions to provide functionality. Data, such as computer-readable instructions and/or user-related data, can be stored on/in storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 1418(2) can be viewed as a system on a chip (SOC) type configuration. In such a case, functionality provided by the device can be integrated on a single SOC or multiple coupled SOCs. One or more processors 1414 can be configured to coordinate with shared resources 1426, such as storage 1416, etc., and/or one or more dedicated resources 1428, such as hardware blocks configured to perform certain specific functionality. Thus, the term "processor" as used herein can also refer to central processing units (CPUs), graphical processing units (GPUs), field programable gate arrays (FPGAs), controllers, microcontrollers, processor cores, hardware processing units, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU, CPUs, GPU or GPUs). The program code can be stored in one or more computer-readable memory devices, such as computer-readable storage media. The features and techniques of the components are platform-independent, meaning that they may be implemented on a variety of commercial computing platforms having a variety of processing configurations.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable medium" can include signals. In contrast, the term "computer-readable storage medium" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Example Methods

Figure 15:
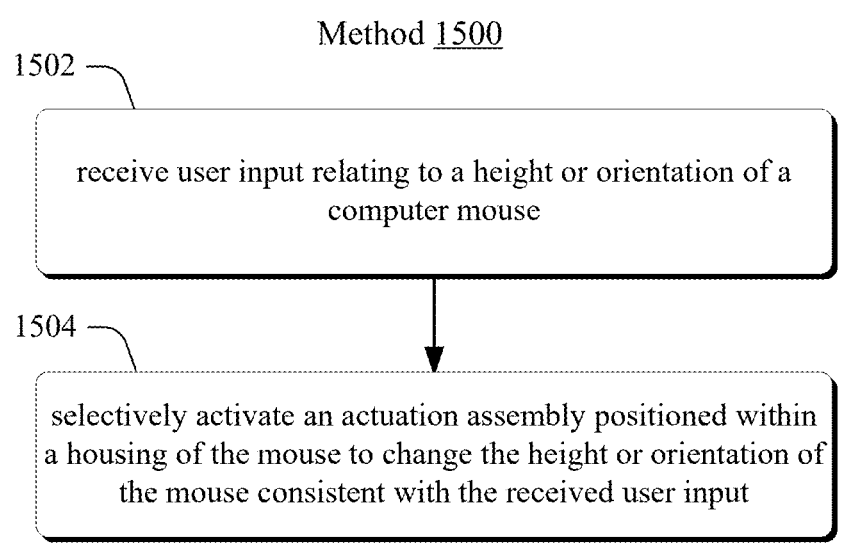
FIG. 15 illustrates an example method that can physically configure a computer mouse in accordance with some implementations of the present concepts.

FIG. 15 illustrates an example method 1500, consistent with some implementations of the present concepts. This is a device implemented method. In some cases, methods are stored on computer-readable storage media that store instructions that are executed by a processor to perform the method.

At block 1502 the method receives user input relating to a height or orientation of a computer mouse. The receiving may entail a circuitous route. For instance, the user input may be received on input devices of a computer mouse. The computer mouse may send the user input to a computer. The computer in turn may recognize the context of the user input as input relating to the configuration of the computer mouse. The computer may send the user input, in raw or processed form, back to the computer mouse for implementation. The computer mouse can take actions to cause the height and/or orientation of the computer mouse to be adjusted consistent with the user input. This aspect is described below relative to block 1504.

At block 1504 the method selectively activates an actuation assembly positioned within a housing of the mouse to change the height or orientation of the mouse consistent with the received user input. Activating the actuation assembly may entail powering one or more electric motors on the computer mouse. The electric motor provides a force that drives a mechanism, such as a post or beam relative to a housing of the computer mouse. In some cases, the powering can also entail activating one or more clutches or other devices that selectively transfer or do not transfer force from the electric motor to a mechanism. These clutch type devices allow an individual electric motor to be shared among multiple actuation assemblies. Other implementations may dedicate an electric motor to each actuation assembly in a one-to-one ratio.

Although the subject matter has been described in language specific to structural features and/or methodological acts relating to physical shape, size, and orientation configurable mice, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

ADDITIONAL EXAMPLES

Various examples are described above. Additional examples are described below. One example includes a system comprising a mouse having adjustable height tilt and cant relative to a horizontal reference surface and a host device configured to generate a user interface (UI) through which a user can define a desired height tilt and cant and the host device configured to cause the mouse to automatically adjust to the desired height tilt and cant defined by the user on the UI.

Another example can include any of the above and/or below examples where the UI is configured to provide an incremental range of values for the height tilt and cant from which the user can define the desired height tilt and cant.

Another example can include any of the above and/or below examples where the UI is configured to provide a preview of the desired height tilt and cant before automatically adjusting the mouse to the desired height tilt and cant.

Another example can include any of the above and/or below examples where the mouse comprises a single actuator that is configured to selectively independently control multiple mechanisms.

Another example can include any of the above and/or below examples where the mouse comprises multiple actuator mechanism pairs.

Another example can include any of the above and/or below examples where the mouse comprises an actuator that is configured to move a mechanism vertically relative to the horizontal reference surface.

Another example can include any of the above and/or below examples where the mouse comprises a housing that includes a base portion and an upper portion.

Another example can include any of the above and/or below examples where the mechanism is configured to extend vertically through the housing towards the horizontal reference surface.

Another example can include any of the above and/or below examples where the mechanism extends between the base portion and the upper portion.

Another example can include any of the above and/or below examples where the base portion and the upper portion overlap one another.

Another example can include any of the above and/or below examples where an extent of the overlap between the base portion and the upper portion depends upon an extent that the actuator has extended the mechanism.

Another example can include any of the above and/or below examples where the host device includes a processor configured to generate the UI and a communication component to send signals to the mouse to cause the mouse to adjust the height tilt and cant consistent with the signals.

Another example can include any of the above and/or below examples where the mouse includes a communication component to receive signals from the host device, a processor and a battery, the processor configured to power an actuator on the mouse from the battery to adjust the height tilt and cant consistent with the signals.

Another example includes a computer mouse that comprises a housing configured to be grasped by a user, a processor positioned in the housing, and an actuator assembly positioned in the housing and configured to be selectively activated by the processor to change a shape of the housing.

Another example can include any of the above and/or below examples where the changed shape comprises mouse height and/or mouse orientation.

Another example can include any of the above and/or below examples where the actuator assembly comprises multiple actuator assemblies.

Another example can include any of the above and/or below examples where the multiple actuator assemblies share an electric motor.

Another example can include any of the above and/or below examples where each actuation assembly includes an electric motor.

Another example can include any of the above and/or below examples where the housing comprises a base portion and an upper portion and wherein the actuation assembly is secured between the base portion and the upper portion and is configured to move the upper portion relative to the base portion.

Another example can include any of the above and/or below examples where the base portion and the upper portion overlap to conceal the actuation assembly.

Another example comprises a computer-readable storage medium storing instructions which, when executed by a computing device, cause the computing device to perform acts comprising, receiving user input relating to a height or orientation of a computer mouse, and selectively activating an actuation assembly positioned within a housing of the mouse to change the height or orientation of the mouse consistent with the received user input.

Another example can include any of the above and/or below examples where receiving user input comprises receiving commands for activating the actuation assembly from a computer that generated a user interface through which the user input was received.

The invention claimed is:

1. A system comprising:
a mouse having adjustable height tilt and cant relative to a horizontal reference surface; and,
a host device configured to generate a user interface (UI) that shows both an existing mouse configuration comprising existing height tilt and cant of the mouse and a new mouse configuration, the UI configured to allow a user to define a desired height tilt and cant of the new mouse configuration and the host device configured to cause the mouse to automatically adjust to the desired height tilt and cant of the new configuration as defined by the user on the UI.

2. The system of claim 1, wherein the UI is configured to provide an incremental range of values for the height tilt and cant from which the user can define the desired height tilt and cant.

3. The system of claim 1, wherein the UI is configured to provide a preview of the desired height tilt and cant before automatically adjusting the mouse to the desired height tilt and cant.

4. The system of claim 1, wherein the mouse comprises a single actuator that is configured to selectively independently control multiple mechanisms.

5. The system of claim 1, wherein the mouse comprises multiple actuator mechanism pairs.

6. The system of claim 1, wherein the mouse comprises an actuator that is configured to move a mechanism vertically relative to the horizontal reference surface.

7. The system of claim 6, wherein the mouse comprises a housing that includes a base portion and an upper portion.

8. The system of claim 7, wherein the mechanism is configured to extend vertically through the housing towards the horizontal reference surface.

9. The system of claim 7, wherein the mechanism extends between the base portion and the upper portion.

10. The system of claim 9, wherein the base portion and the upper portion overlap one another.

11. The system of claim 10, wherein an extent of the overlap between the base portion and the upper portion depends upon an extent that the actuator has extended the mechanism.

12. The system of claim 1, wherein the host device includes a processor configured to generate the UI and a communication component to send signals to the mouse to cause the mouse to adjust the height tilt and cant consistent with the signals.

13. The system of claim 12, wherein the mouse includes a communication component to receive signals from the host device, a processor and a battery, the processor configured to power an actuator on the mouse from the battery to adjust the height tilt and cant consistent with the signals.

14. A computer mouse, comprising:
   a housing configured to be grasped by a user, the housing comprising a base portion that includes a central flat area and perimeter area that extends upwardly from the base portion and a curved upper portion having a downwardly extending perimeter area that overlaps the upwardly extending perimeter area of the base portion;
   a processor positioned in the housing; and,
   four actuation assemblies positioned in the housing and configured to be individually selectively activated by the processor to change a shape of the housing by adjusting an extent of the overlap between the downwardly extending perimeter area that overlaps the upwardly extending perimeter area of the base portion.

15. The computer mouse of claim 14, wherein the changed shape comprises mouse height and/or mouse orientation.

16. The computer mouse of claim 14, wherein the four actuation assemblies share an electric motor.

17. The computer mouse of claim 14, wherein each actuation assembly includes an electric motor.

18. The computer mouse of claim 14, wherein the base portion and the upper portion overlap to conceal the four actuation assemblies.

* * * * *